US006668714B2

(12) United States Patent
Wollny et al.

(10) Patent No.: US 6,668,714 B2
(45) Date of Patent: Dec. 30, 2003

(54) PLATEN FOR MULTISTAGE PANEL PRESS

(75) Inventors: Klaus Wollny, Krefeld (DE); Otto Voss, Krefeld (DE); Klaus Nube, Moers (DE)

(73) Assignee: Siempelkamp Maschinen- und Anlagenbau GmbH & Co. KG, Krefeld (DE)

( * ) Notice: Subject to any disclaimer, the term of this patent is extended or adjusted under 35 U.S.C. 154(b) by 41 days.

(21) Appl. No.: 10/146,146

(22) Filed: Oct. 26, 2001

(65) Prior Publication Data

US 2003/0024410 A1 Feb. 6, 2003

(30) Foreign Application Priority Data

Nov. 1, 2000 (DE) ........................................ 100 54 002

(51) Int. Cl.[7] ................................................ B29C 43/52
(52) U.S. Cl. ....................................... 100/324; 100/326
(58) Field of Search ................................ 100/315, 321, 100/323, 324, 325, 326, 92, 316, 322

(56) References Cited

U.S. PATENT DOCUMENTS 3,754,499 A * 8/1973 Heisman et al. ............ 100/323
4,264,293 A * 4/1981 Rourke ........................ 425/407
4,649,249 A * 3/1987 Odor .......................... 219/659
4,846,925 A * 7/1989 Ishida et al. ............. 156/583.1
5,195,428 A * 3/1993 Gawlitta et al. .............. 100/73
5,611,269 A * 3/1997 Bielfeldt ..................... 100/311
6,318,989 B1 * 11/2001 Bonomo et al. ......... 425/405.1

* cited by examiner

*Primary Examiner*—Allen Ostrager
*Assistant Examiner*—Shelley Self
(74) *Attorney, Agent, or Firm*—Herbert Dubno; Andrew Wilford

(57) ABSTRACT

A press has at least two rigid and generally planar platens normally brought together to hot-press a panel workpiece. Each platen is formed with a plurality of parallel longitudinally throughgoing bores having ends open at edges of the platen, an array of orifices opening at at least one face of the platen and communicating with the bores between the ends thereof, at least one manifold passage extending transversely in the platen adjacent at least one of the edges and intersecting the bores, and a heat-exchange passage offset from the bores and manifold passage. A heat-exchange liquid is passed through the heat-exchange passages. The ends of the bores are closed, and a treatment vapor is injected under superatmospheric pressure into or withdrawn by subatmospheric pressure from the manifold passages so as to expel the vapor from the platens via the orifices or suck vapor from the platens in through the orifices.

7 Claims, 4 Drawing Sheets

PLATEN FOR MULTISTAGE PANEL PRESS

FIELD OF THE INVENTION

The present invention relates to a press platen. More particularly this invention concerns a platen used in a multistage panel-making press.

BACKGROUND OF THE INVENTION

Panels such as plywood, chipboard, oriented-strand board, and fiberboard are typically made in multistage panel presses where the layers and/or fibers are hot pressed together with a binder to produce rigid finished panels. Not only must the press platens be heated and/or cooled to activate and cure the binder, but it is standard to inject steam, which may be superheated, into the workpieces as they are being pressed and even to suck any residual steam or other vapors out of the panels before the press is opened. Such a panel press is used for the production of oriented-strand board using heat-cured phenolic-resin binders. Melamine panels and structural members having thermosetting resins are also made in such a press.

Hence it is necessary to provide each platen with a network of heating or cooling passages through which a heat-exchange liquid is passed in order to maintain the platens at the desired temperature. Furthermore each platen is provided with a network or array of steam passages that communicate through a multiplicity of orifices with the surfaces of the platens. As mentioned above, this latter network can be pressurized with steam to inject steam into the workpiece, or can be evacuated to suck steam or other vapors out of the workpiece.

In a standard system as shown in German patent 570,005 the steam passages that open via the respective orifices at the platen faces are formed as blind bores that are connected to a manifold at one edge of the platen. This system often leads to uneven distribution of steam through the workpiece, with those portions close to the manifold getting more steam than the portions remote from the manifold. Such steam passages make it very difficult to form the necessary meander passages through which the heat-exchange liquid is flowed in the platen.

A system has been proposed where grooves are cut into the faces of the platen, and then perforated bars are welded into the grooves, turning the grooves into passages open laterally through the perforations in the bars. The bars must be set perfectly flush with the platen face to produce a smooth workpiece, and installation must be essentially perfect or the system will not work. Manufacture of such a platen is therefore very complex and expensive, and the finished product is never perfectly smooth. With time, the considerable thermal deformation the platen is subject to often leads to local deformations that are pressed into the workpieces, which deformations are aggravated by the fact that the bars are often of a material with a thermal coefficient of expansion that is different from that of the platen. Furthermore the bores in the bars often fill with particles from the workpiece so that eventually the platen must be replaced or meticulously cleaned.

OBJECTS OF THE INVENTION

It is therefore an object of the present invention to provide an improved platen for a panel press.

Another object is the provision of such an improved platen for a panel press which overcomes the above-given disadvantages, that is which is of simple construction but that is perfectly smooth and that has a long service life.

SUMMARY OF THE INVENTION

A press has according to the invention at least two rigid and generally planar platens normally brought together to hot-press a panel workpiece. Each platen is formed with a plurality of parallel longitudinally throughgoing bores having ends open at edges of the platen, an array of orifices opening at at least one face of the platen and communicating with the bores between the ends thereof, at least one manifold passage extending transversely in the platen adjacent at least one of the edges and intersecting the bores, and a heat-exchange passage offset from the bores and manifold passage. A heat-exchange liquid is passed through the heat-exchange passages. The ends of the bores are closed, and a treatment vapor is injected under superatmospheric pressure into or withdrawn by subatmospheric pressure from the manifold passages so as to expel the vapor from the platens via the orifices or suck vapor from the platens in through the orifices.

Thus the various flow-passage systems are all perfectly integrated in the one-piece cast-metal plate forming the platen. These passages are made by the simple expedient of drilling through the plates to form the various flow and manifold passages, and then to cap the ends except where flow fittings will be mounted. Such a procedure is relatively simple and leaves the faces of the plate perfectly planar and smooth. What is more, it is not necessary to introduce materials with coefficients of thermal expansion different from that of the platen into the platen, so that as same is heated and cooled it will retain its shape.

According to the invention the heat exchange passages extend transversely and the platens are longitudinally elongated. Each have two of the manifold passages each at a respective longitudinal end edge of the respective platen and the ends of the passages are closed by simple plugs fitted to the bore ends.

The bores are arrayed in parallel planar arrays provided adjacent the faces of the respective platens and communicating therewith through respective orifices. Each array has at least one respective manifold passage. The meander heat-exchange passage is between the planar bore arrays and can be formed by a series of transversely throughgoing bores and longitudinally extending manifold bores.

In accordance with the invention a valve between the manifold passages and means for drawing in a fluid and the means for injecting a treatment vapor for alternately connecting the manifold passages thereto. Thus the system can be used to draw a treatment fluid out of the workpiece if desired. Similarly of course the heat-exchange passages can be used for heating and/or cooling the platens.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
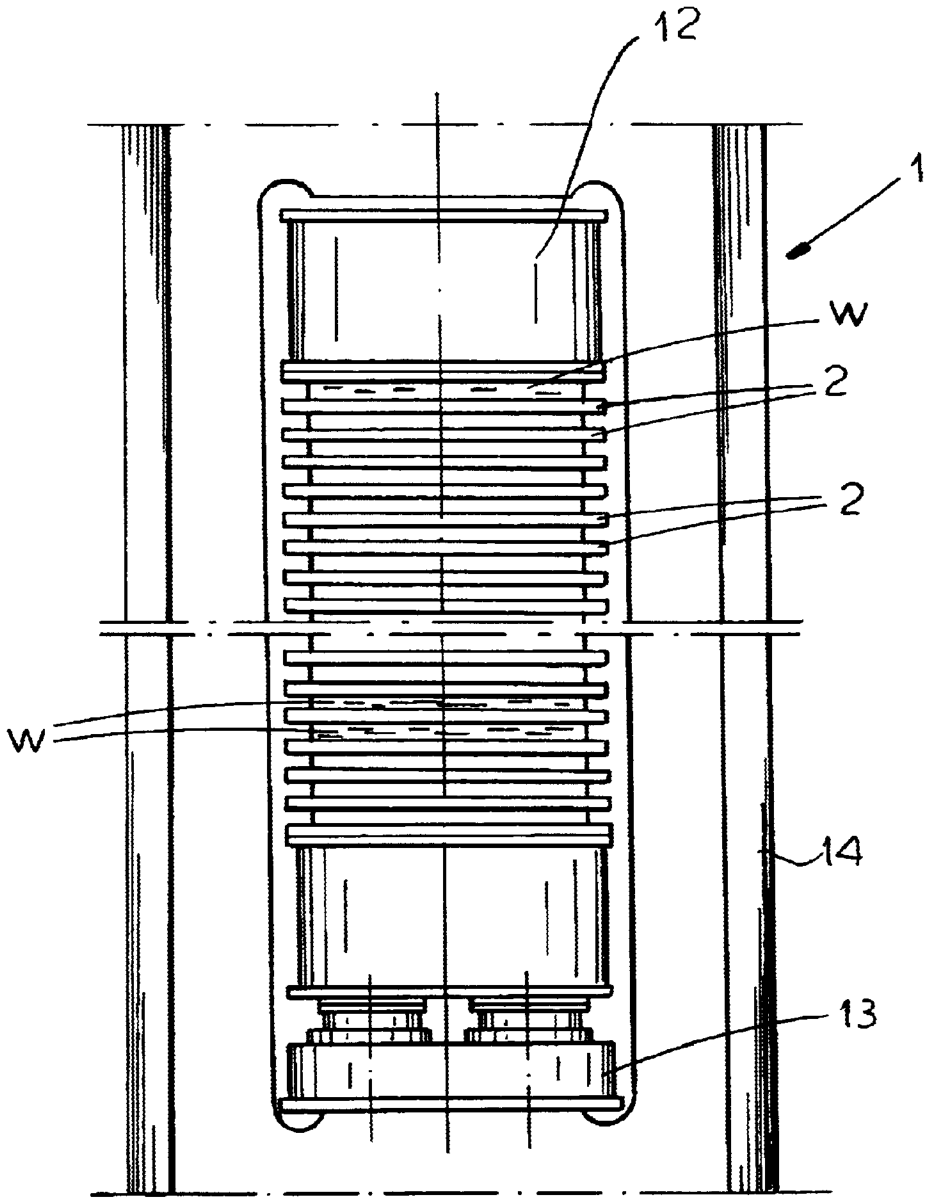
FIG. 1 is a small-scale side view of a multiplaten press according to the invention.
Figure 2:
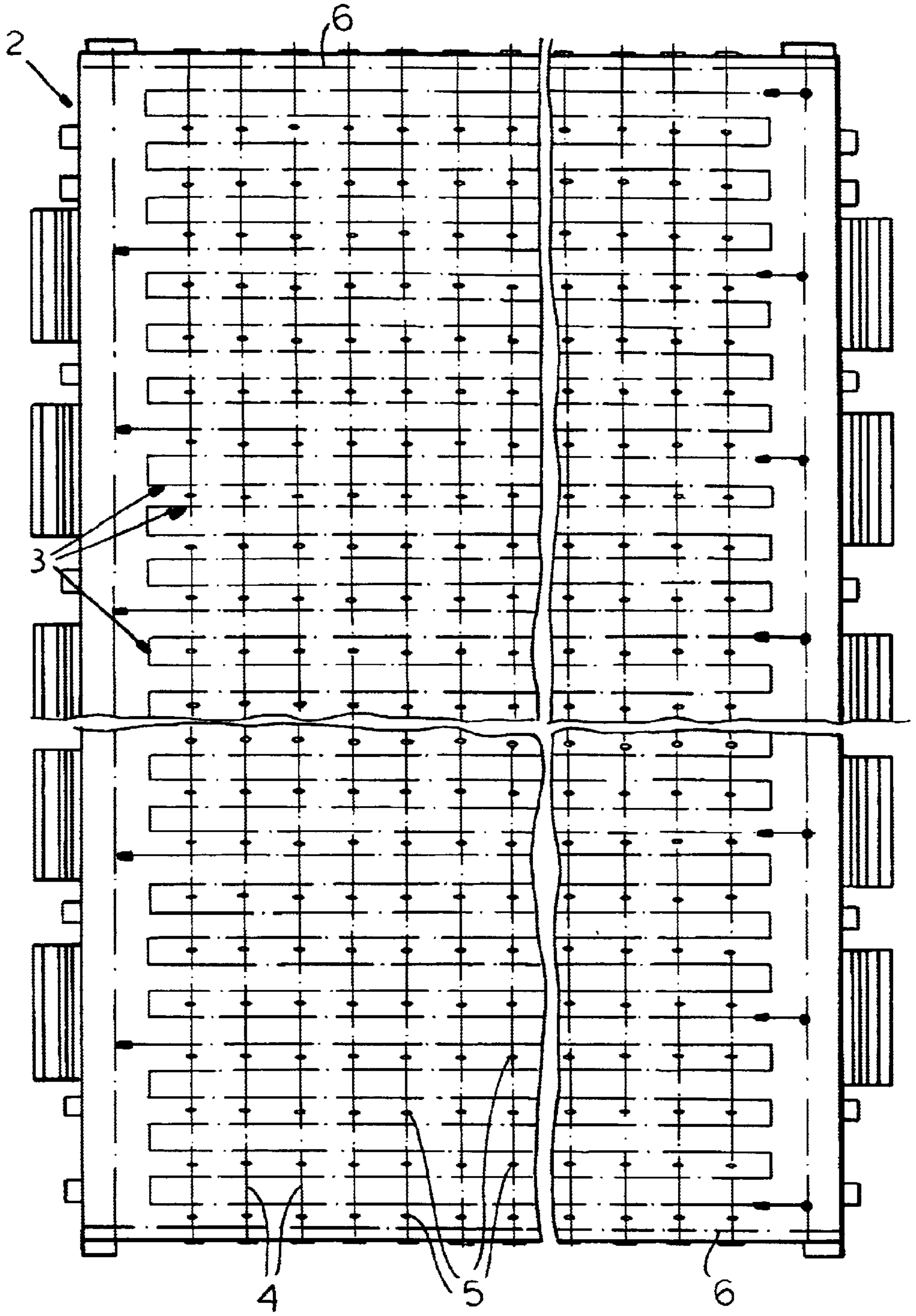
FIG. 2 is a top view of a platen in accordance with the invention.
Figure 3:
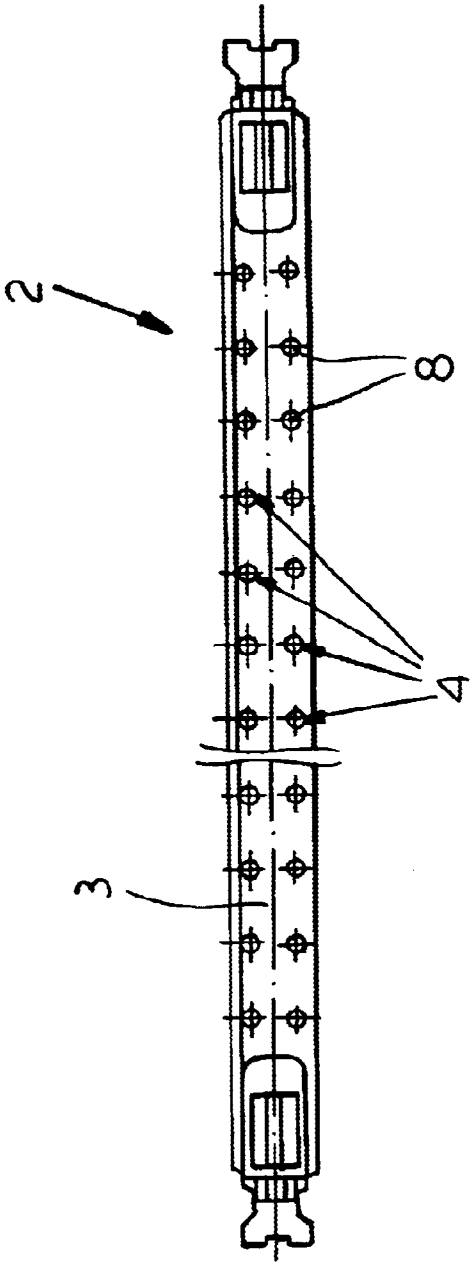
FIG. 3 is an edge view of the platen.
Figure 4:
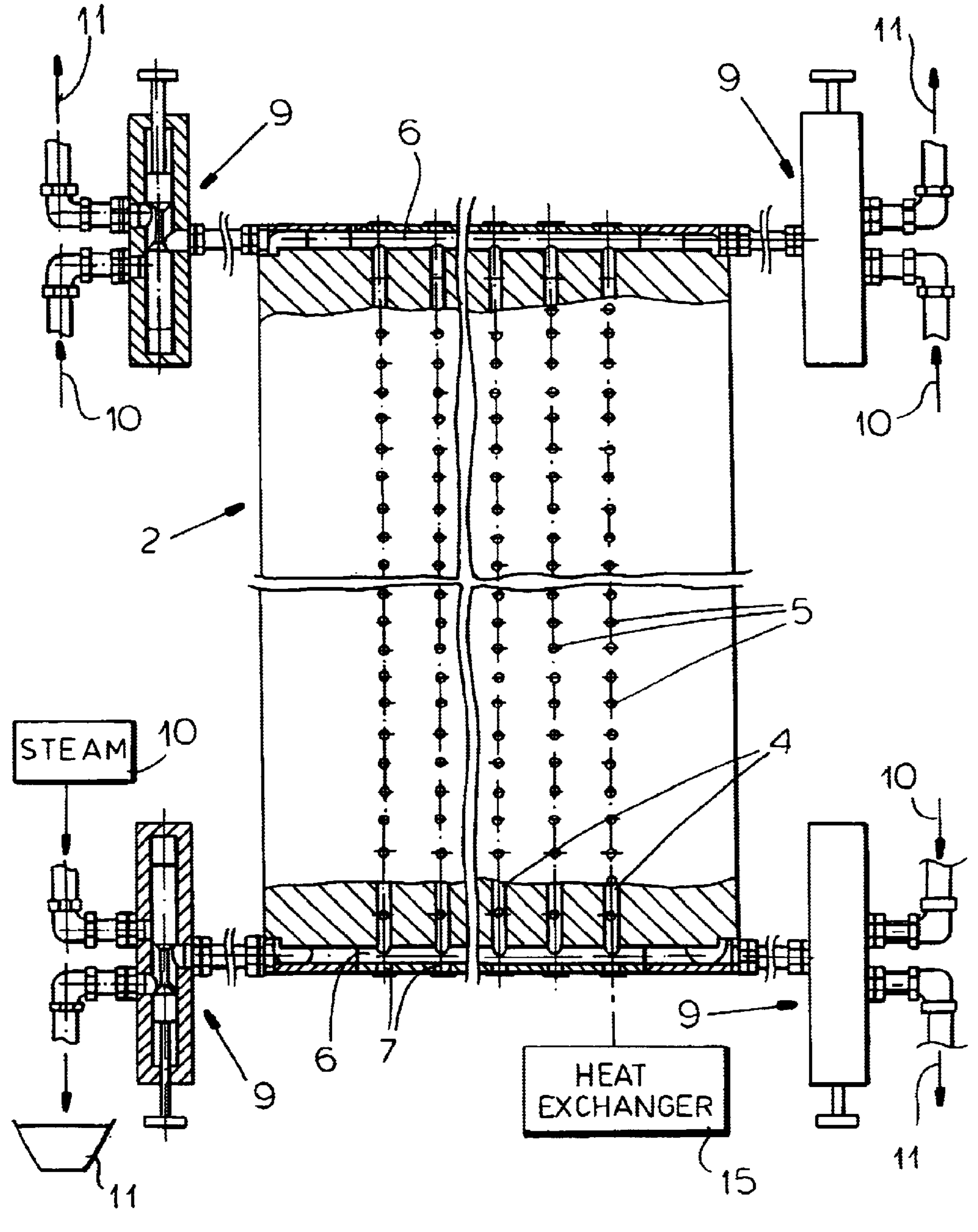
FIG. 4 is a partly schematic and partly sectional top view of the platen.

As seen in FIG. 1 a platen press 1 has a plurality of basically planar platens 2 formed as rigid cast-metal plates and normally pressed together between upper and lower actuators 12 and 13 on a frame 14. Each platen 2 is formed as shown in FIGS. 2 and 3 with a plurality of parallel and longitudinally throughgoing steam passages 4 having end regions connected at transverse manifold passages 6. An array of small-diameter orifices 5 open from the passages 6 at faces of the platen 2. As best shown in FIG. 3 the steam passages 4 are provided in two separate planar arrays each under a respective face of the platen 2, and between these arrays are further heat-exchange passages illustrated schematically at 3.

In accordance with the invention the steam passages 4 are completely throughgoing and have ends 7 open at respective edges of the platen 2 where they are closed by plugs 8. Thus they are formed simply by boring clear through the platens. The transverse manifold passages 6 are similarly formed, but are provided at their end with valve fittings 9 allowing the steam passages 4 to be connected to a source 10 of pressurized steam or a vacuum side of a pump 11.

In use the platen temperature is continuously maintained by a heat-exchanger 15 connected to the heat-exchange passages 3 and circulating an appropriate liquid through them. Workpieces W to be pressed, typically mats comprised of sheets, particles, fibers, or the like and a binder or adhesive, are loaded between the platens 2 which are pressed together by the actuators 12 and 13.

Once the workpieces w are compressed between the platens, the valves 9 are actuated to admit high-pressure steam from the sources 10 into the passages 4 so that the steam escapes through the orifices 5 and is injected into the workpieces w. After an appropriate treatment time the valves 9 are switched to apply vacuum from the pumps 11 to the passages 4 and thereby suck excess steam and any other vapors out of the workpieces w.

Finally as the press is opened a last sudden high-pressure pulse of steam or other gas is admitted by the valves 9 to the passages 4 both to shock free the surfaces of the workpieces w from the faces of the platens 2 and to blow any particles out of the orifices 5.

We claim:

1. A press comprising:

at least two rigid, generally rectangular, and generally platens each having a pair of generally planar and parallel faces, a pair of generally parallel longitudinal edges, and a pair of generally parallel transverse edges bridging ends of the longitudinal edges, the platens each being formed with a plurality of parallel longitudinally throughgoing treatment-fluid bores having ends open at the transverse edges of the platen, an array of orifices opening at at least one of the faces of the platen and communicating with the treatment-fluid bores between the ends thereof, at least one manifold passage extending transversely in the platen adjacent one of the transverse edges and intersecting all of the treatment-fluid bores, and a plurality of parallel transversely throughgoing heat-exchange bores offset perpendicular from the platen faces from the treatment-fluid bores and manifold passage and having ends open at the longitudinal edges of the platen;

means for passing a heat-exchange liquid through the heat-exchange bores;

plugs closing the ends of the treatment-fluid and heat-exchange bores; and means for injecting a treatment vapor into the manifold passages and thereby expelling the vapor from the platens via the orifices.

2. The platen press defined in claim 1 wherein the platens are each formed as a rigid cast-metal plate.

3. The platen press defined in claim 1 wherein the platens are longitudinally elongated.

4. The platen press defined in claim 1 wherein the platens each have two of the manifold passages each at a respective one of the longitudinal edges of the respective platen.

5. The platen press defined in claim 1 wherein the treatment-fluid bores are arrayed in two parallel planar arrays provided adjacent the faces of the respective platens and communicating therewith through respective orifices, each array having at least one respective manifold passage.

6. The platen press defined in claim 5 wherein the heat-exchange bores are between the planar treatment-fluid bore arrays.

7. The platen press defined in claim 1, further comprising means for drawing in a fluid; and valve means between the manifold passages and the means for drawing in a fluid and the means for injecting a treatment vapor for alternately connecting the manifold passages thereto.

* * * * *